Oct. 28, 1952     J. J. GRECO     2,615,356
PUNCH PLIER FOR EYEGLASS FRAMES
Filed July 16, 1949
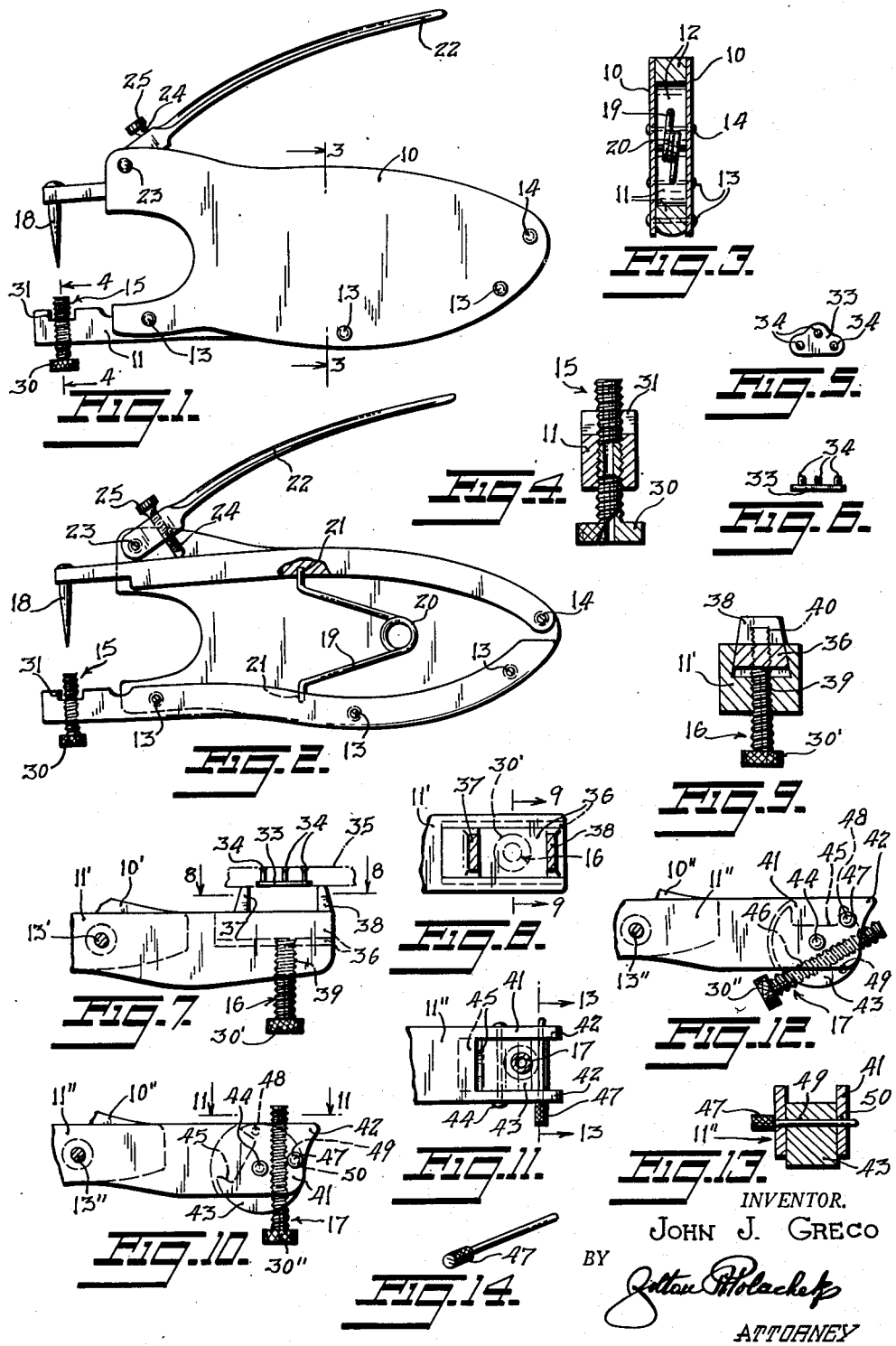
INVENTOR.
JOHN J. GRECO
BY
ATTORNEY Patented Oct. 28, 1952

2,615,356

UNITED STATES PATENT OFFICE 2,615,356

PUNCH PLIER FOR EYEGLASS FRAMES

John J. Greco, Brooklyn, N. Y.

Application July 16, 1949, Serial No. 105,078

3 Claims. (Cl. 81—3.6)

This invention relates to new and useful improvements in a hand tool for use by opticians or others employed in the optical trade for removing pins from optical mountings, and, more particularly, the aim is to provide novel and valuable improvements in a tool of the kind mentioned characterized by the inclusion of a fixedly mounted jaw formed with a tubular die or analogous device for engaging the mounting about the head of the pin which is to be removed so that the pin may be pushed thereby to remove it from the mounting.

The present invention is herein shown as included in a tool also having a movable jaw arranged to be moved toward the fixed jaw and provided with a pointed plunger arranged in a manner to be pressed relative to a pin to be removed, to push the pin from the mounting when the movable jaw is moved toward the fixed jaw, and in a tool wherein said jaws are mounted between the adjacent faces of spaced side plates a means is, in the space between the jaws and within the plates, arranged in a manner to normally hold the jaws spaced apart, and in a tool further incorporating the above and other special features disclosed and claimed in my copending patent application Serial No. 77,228, now abandoned, filed February 18, 1949.

According to the teachings of that copending patent application, the said tubular die is a cylindrically tubular element having a bore therethrough and intermediate its ends incorporating an annular flange or collar-enlargement, and the jaw for carrying said die has a cylindrical aperture therethrough into which the portion of the die below said flange is to be forced, until the underside of said flange abuts the upper surface of the last-named jaw; the arrangement being such that, incidental to removal of a pin from a mounting, said pin is pushed down through and discharged from the bottom of said bore.

Sometimes, however, an optician or the like, particularly in the case of eye-glasses, and especially in connection with eye-glasses of the kind known as spectacles, is faced with the task of quick and easy removal of a pin or pins forming part of a plate-like addition to the optical mounting. These additions, generally integrally carrying a plurality of pins projected parallelly therefrom, are most commonly encountered in spectacles where the lens frame and the temple pieces are formed of a plastic material in imitation of tortoise shell or the like, rather than of metal.

According to said teachings of my said copending patent application, when such a plate-like addition has to be removed from a mounting, said tubular die must be upwardly and sometimes difficultly manually removed from its said aperture through the jaw carrying the die, in order to establish for the time being a generally flat surface at the upper side of the die-carrying jaw and surroundingly of said aperture. But then difficulties present themselves in regard to the quick and safe removal of said plate-like addition.

The improvements of the present invention mainly are directed toward overcoming such difficulties as hereinabove explained.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of an optical tool constructed in accordance with the present invention.

Fig. 2 is a view similar to Fig. 1, but with the near side plate removed and with a portion of another part broken away to reveal interior construction.

Fig. 3 is a cross sectional view taken on the line 3—3 of Fig. 1.

Fig. 4 is an enlarged cross sectional view taken on the line 4—4 of Fig. 1, one form of the new tubular die pursuant to the present invention.

Fig. 5 is a somewhat enlarged top plan view of a frequently encountered type of the aforesaid plate-like addition to an optical mounting.

Fig. 6 shows said addition side elevationally.

Fig. 7 is an enlarged fragmentary side elevational view of the front end of the fixed jaw, illustrating a tubular die in combination with a modification of the structure of said jaw; with here the tubular die present in association with an auxiliary and readily attachable and detachable mount of special anvil character—said mount desirably being furnished with a plurality of its fellows, one differing from another relative to its anvil characteristics, where such a provision is found advisable for selective use at any one time of any one of said mounts.

Fig. 8 is a horizontal section, taken substantially on the line 8—8 of Fig. 7.

Fig. 9 is a transverse vertical section, taken on the line 9—9 of Fig. 8.

Fig. 10 is a view similar to Fig. 7, but illustrating a further tubular die mount modification, with here said die carried by an auxiliary support permanently secured to the outer end of said fixed jaw but readily rotatively rearrangeable on said jaw according to the particular task at hand; this view showing one adjustment of said support.

Fig. 11 is a horizontal section, taken on the line 11—11 of Fig. 10.

Fig. 12 shows the parts of Fig. 10, but with said support in a different adjustment.

Fig. 13 is a transverse vertical section, taken on the line 13—13 of Fig. 11.

Fig. 14 is a perspective view of a dual-use bodily removable and insertable locking stud.

It will be noted that Figs. 7–14, like Figs. 4–6 as already stated, are drawn to an enlarged scale; such scale being several times actual size.

The optical tool, according to the present invention, and as herein illustrated, includes, as shown in Figs. 1–3, a pair of spaced side plates 10, a fixed jaw 11 and a movable jaw 12. The fixed jaw 11 is extended between the adjacent faces of the side plates 10 along the bottom edges thereof and is secured in position by several rivets 13. The movable jaw 12 is extended between the adjacent faces of the plates along the top edges thereof and is pivotally secured in position by a single rivet 14 which passes through the side plates 10 and the rear end of the movable jaw. The front ends 11ª and 12ª of the fixed jaw 11 and the movable jaw 12, respectively, are extended beyond the adjacent ends of the side plates 10, as clearly shown in Figs. 1 and 2.

The new tubular die, as to those of its possible variations pursuant to the invention selected for being shown herein, in Figs. 1–4 is designated 15, in Figs. 7–9 is designated 16, and in Figs. 10 to 12 is designated 17. Further details of these merely exemplifying embodiments of the invention will below be described more in detail.

The projected front end of the movable jaw is provided with a pointed plunger 18 arranged so that the pointed lower end thereof will slightly enter the top end of the tubular die when the movable jaw 12 is moved toward the fixed jaw 11. The free end of the pointed plunger 18 is to be engaged against the end of the pin, to be removed, opposite the headed end thereof, so that when the movable jaw 12 is moved toward the fixed jaw 11, with the top of the tubular die engaged about the head of the pin, the pin will be pressed from the optical mounting.

Means is provided between the jaws 11 and 12 and between the adjacent faces of the side plates 10 for holding the jaws spaced. This means comprises a spring 19 formed with a coiled portion 20 intermediate of its ends. The free ends of the spring 19 are bent to engage complementary recesses 21 formed in the adjacent faces of the jaws 11 and 12, as shown in Fig. 2.

A handle 22 has one end pivotally mounted between the adjacent faces of the side plates 10 above the movable jaw 12, by means of a single rivet 23. The pivoted end of the handle is engaged by the top face of the movable jaw 12 to act as a stop to limit pivoting of the movable jaw away from the fixed jaw 11 under the influence of the spring 19.

An adjustment screw 24 is threaded through the handle 22 outward of the rivet 23 and bears against the top face of the movable jaw 12. The outer end of the screw 24 is formed with an enlarged knurled knob 25 by which the screw can be adjusted for controlling the normal spacing of the pointed plunger 18 from the tubular die and the distance that the plunger 18 will enter the top end of said die when the movable jaw 12 is moved toward the fixed jaw 11.

The manner of using the optical tool of the present invention is as follows:

The tool is taken in one hand with the thumb extended over the top of the handle 22 and with the fingers extended beneath the bottom edges of the side plates 10 and the adjacent fixed jaw 11. The optical mounting from which the pin is to be removed is then taken in the other hand and the head of the pin is extended into the tubular die with the die surrounding the mounting about the head. The mounting is then turned to align the free end of the pin with the free end of the pointed plunger 18. The tool is then squeezed moving the free end of the handle 22 toward top edges of the side plates 10. This moves the movable jaw 12 toward the fixed jaw 11 against the action of the spring 19 and causes the pin to be pressed from the optical mounting through the tubular die to drop from the open bottom end of said die. When the pin is completely ejected, pressure on the handle 22 is released and the tension of the spring 19 will return the movable jaw 12 and the handle 22 to their starting position.

Referring now more particularly to the details of the tubular die 15 shown in Figs. 1, 2 and 4, said die is a cylindrically tubular one, of an internal diameter to allow easy passage through and drop from the bore thereof of a pin removed from a mounting; as in our said copending application. However, here said die is a spirally adjustable one, having an external thread matching the thread of a tapped aperture through the fixed jaw 11; and the die is thus adjustable, quickly and manually, by means of the inclusion in the die of a bottom enlarged head 30 preferably knurled as shown.

Also, transversely extended across the upper side of said jaw 11 is a horizontal slot 31, somewhat wider than the thread-crest diameter of the die 15 and centered relative to the axis of the die. Adjacent to and in rear of said slot is a semi-circular recess 32 extended lengthwise of the jaw at the upper face thereof. These provisions 31 and 32 allow of quick and easy removal of certain types of the aforesaid plate-like additions as sometimes encountered—especially when the die 15, by means of its head 30, has been spirally lowered to place its top at a particular height, as to bring said top to about the level of the floor of the slot 31.

The pin-carrying plate-like addition illustrated in Figs. 5 and 6, its plate marked 33, and its pins designated at 34, is typically representative of the hereinabove first-mentioned frequently encountered style of such addition. An addition of this kind is illustrated in Fig. 7 in course of being removed from a mounting, the latter fragmentarily indicated in dot and dash lines and designated 35; and as so being removed, especially efficiently, by the aid of the modification of Figs. 7–9.

Referring now to the last-named views, wherein the parts designated 10', 11', 13' and 30' correspond, respectively, to the parts marked 10, 11, 13 and 30 in Fig. 2, the lower jaw 11' is here shown as shaped to provide a slideway for taking a slide plate 36 of dovetail cross-section as best shown in Fig. 9. This plate, in the form thereof shown as representative perhaps of a plurality of its fellows to be individually selectively set in said slideway, has a depressed-anvil characteristic resulting from the presence of two upstanding posts 37 and 38 rigid on the plate 36. The space between the facing sides of these posts provides a localized depression in the anvil means, for drop down into said depression of the platelike addition 33 with its pins 34 when, with the elements arranged as in Fig. 7, the plunger 18 is pushed down against say the upper end of the central pin 34.

When, however, an individual pin is to be removed from the optical mounting, the slide 36 is removed; the said posts serving as conveniently manually engageable finger-pieces for such removal, and the tubular die 16 is used. It will be observed that this die is in a tapped aperture 39 the upper end of which terminates at the floor of the slideway for taking the slide plate 36, so the permanent presence of said die does not interfere with use when desired of one or more of said slide plates as above stated. When the die 16 is to be used, it can be turned up to have its top at any height desired, as for instance indicated in dot and dash at 40 in Fig. 9.

Referring to the modification illustrated in Figs. 10–14, wherein the parts designated 10'', 11'', 13'' and 30'' correspond, respectively, to the parts marked 10, 11, 13 and 30 in Fig. 2, the lower jaw 11'' is here shown as shaped to present at its front end a fork 41, concavely rounded at its crotch as indicated in broken lines in Figs. 10 and 12; this rounding to correspond with the generally cylindrical periphery of a disk or drum 43 rotatively mounted in said fork. The two tines of the said fork are shaped to present a flat-top upper nose 42.

The disk 43 has a cut-out 44, extending all the way through the thickness thereof, and of the cross-section indicated; this when brought to its assigned location for aid in the removal from a mounting 35 of an addition like the addition 33 for serving as a means equivalent to the space between the posts 37 and 38.

Said disk, further, has an acentric or off-center tapped aperture therethrough, this for taking the tubular die 17.

As will be noted, the disk can be arranged as in Fig. 12, for use of the hand-tool as mentioned in the second preceding paragraph; or as in Fig. 11, now for use of the tubular die as earlier herein explained.

In order positively to maintain the disk in either of its said adjustments, a stud 47 having a knurled suitably enlarged head may be provided, for passage of the cylindrical sufficiently long shank of the stud through either one of two pairs of aligned holes 48 and 49 through the tines of the fork 41 and also through a position-registering hole for the disk 43 and extending therethrough parallel to the axis of the pivot-rivet 44.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. An optician's hand-tool comprising a pair of pivotally interconnected members shaped and arranged to present at a working zone a pair of jaws relatively movable for approach of one jaw toward the other, a means for urging said jaws toward a predetermined normal separation, a tubular die carried by one of said jaws, a pointed plunger projected from the other jaw and so fixed and disposed on the latter that on relatively moving said jaws the pointed end of said plunger moves toward entry into the adjacent end of said die; said die having a bore extending therethrough from end to end and being externally threaded; and means for rotating said die relative to said jaw about an axis at right angles to the bore of the die, said rotating means comprising a pivotally mounted disk mounted on the said one jaw and having a tapped aperture through which said die is threaded, the axis of said tapped aperture being located to one side of the axis of pivoting of the disk, said disk also having a cut-out shaped to act as an anvil having a localized depression when the disk is given an angular movement to dispose said anvil near the side of the die-carrying jaw which faces the other jaw.

2. An optician's hand-tool comprising a pair of pivotally interconnected members shaped and arranged to present at a working zone a pair of jaws relatively movable for approach of one jaw toward the other, a means for urging said jaws toward a predetermined normal separation, a tubular die carried by one of said jaws, a pointed plunger projected from the other jaw and so fixed and disposed on the latter that on relatively moving said jaws the pointed end of said plunger moves toward entry into the adjacent end of said die, said die having a bore extending therethrough from end to end and being externally threaded, and means for rotating said die relative to said jaw about an axis at right angles to the bore of the die, said rotating means comprising a pivotally mounted disc mounted on the said one jaw and having a tapped aperture through which said die is threaded, the axis of said tapped aperture being located to one side of the axis of pivoting of the disk, said disk also having a cut-out shaped to act as an anvil having a localized depression when the disk is given an angular movement to dispose said anvil near the side of the die-carrying jaw which faces the other jaw, the parts being so arranged that when said disk is in another angular adjustment the die is extended so that its bore is in line with said plunger.

3. An optician's hand-tool comprising a pair of pivotally interconnected members shaped and arranged to present at a working zone a pair of jaws relatively movable for approach of one jaw toward the other, a means for urging said jaws toward a predetermined normal separation, a tubular die carried by one of said jaws, a pointed plunger projected from the other jaw and so fixed and disposed on the latter that on relatively moving said jaws the pointed end of said plunger moves toward entry into the adjacent end of said die, said die having a bore extending therethrough from end to end and being externally threaded, and means for rotating said die relative to said jaw about an axis at right angles to the bore of the die, said rotating means comprising a pivotally mounted disk mounted on the said one jaw and having a tapped aperture through which said die is threaded, the axis of said tapped aperture being located to one side of the axis of pivoting of the disk, said disk also having a cut-out shaped to act as an anvil having a localized depression when the disk is given an angular movement to dispose said anvil near the side of the die-carrying jaw which faces the other jaw, the parts being so arranged that when said disk is in another angular adjustment the die is extended so that its bore is in line with said plunger, and means for positively detaining the disk in either of its two said angular adjustments.

JOHN J. GRECO.

REFERENCES CITED

The following references are of record in the file of this patent:

UNITED STATES PATENTS

| Number | Name | Date |
|---|---|---|
| D. 154,561 | McNamara | July 19, 1949 |
| D. 157,670 | Greco | Mar. 14, 1950 |
| 433,978 | Corning | Aug. 12, 1890 |
| 747,521 | Weston | Dec. 22, 1903 |
| 784,117 | McDaniel | Mar. 7, 1905 |
| 994,229 | Winkler | June 6, 1911 |
| 1,126,324 | Weinstein | Jan. 26, 1915 |
| 1,352,552 | Smith | Sept. 14, 1920 |
| 1,389,371 | Metzger | Aug. 30, 1921 |
| 1,397,614 | Bary | Nov. 22, 1921 |
| 2,049,075 | Munson | July 28, 1936 |
| 2,166,089 | Brenner | July 11, 1939 |
| 2,474,940 | Hansen | July 5, 1949 |

FOREIGN PATENTS

| Number | Country | Date |
|---|---|---|
| 7,601 of 1909 | Great Britain | Mar. 30, 1909 |